(12) United States Patent
Qoutb et al.

(10) Patent No.: US 11,378,466 B2
(45) Date of Patent: Jul. 5, 2022

(54) DISTRIBUTED SPINTRONIC/CMOS SENSOR NETWORK FOR THERMAL AWARE SYSTEMS

(71) Applicant: University of Rochester, Rochester, NY (US)

(72) Inventors: Abdelrahman G. Qoutb, Rochester, NY (US); Eby G. Friedman, Rochester, NY (US)

(73) Assignee: University of Rochester, Rochester, NY (US)

( * ) Notice: Subject to any disclaimer, the term of this patent is extended or adjusted under 35 U.S.C. 154(b) by 152 days.

(21) Appl. No.: 16/787,681

(22) Filed: Feb. 11, 2020

(65) Prior Publication Data
US 2021/0247239 A1 Aug. 12, 2021

(51) Int. Cl.
G01K 3/00 (2006.01)
G01K 7/00 (2006.01)
G01K 7/01 (2006.01)
G01K 13/00 (2021.01)
G01K 1/02 (2021.01)

(52) U.S. Cl.
CPC .............. *G01K 7/01* (2013.01); *G01K 1/026* (2013.01); *G01K 3/005* (2013.01); *G01K 13/00* (2013.01); *G01K 2213/00* (2013.01)

(58) Field of Classification Search
USPC ................................. 374/137, 170, 166, 110
See application file for complete search history.

(56) References Cited

U.S. PATENT DOCUMENTS

| 8,182,141 B1* | 5/2012 | Collins ................. G01K 11/22 374/119 |
| 2012/0181651 A1* | 7/2012 | Jiang ....................... H01L 43/08 257/467 |
| 2013/0003438 A1* | 1/2013 | Merkel .............. G11C 13/0061 365/148 |
| 2013/0151191 A1* | 6/2013 | Ranieri .................. G01K 7/427 702/130 |
| 2019/0171262 A1* | 6/2019 | Ghosh ..................... G06F 1/329 |

OTHER PUBLICATIONS

Alzate, J., et al., "Temperature Dependence of the Voltage-Controlled Perpendicular Anisotropy in Nanoscale MgO—CoFeB—Ta Magnetic Tunnel Junctions," Applied Physics Letters, vol. 104, No. 11, p. 112410, Mar. 2014.
Bakker, A., et al., "Micropower CMOS Temperature Sensor with Digital Output," IEEE Journal of Solid-State Circuits, vol. 31, No. 7, pp. 933-937, Jul. 1996.

(Continued)

*Primary Examiner* — Mirellys Jagan
(74) *Attorney, Agent, or Firm* — Harris Beach PLLC

(57) ABSTRACT

A hybrid integrated thermal sensor device includes a magnetic tunnel junction (MTJ) device electrically coupled in series with at least one CMOS transistor and disposed between a voltage rail terminal and a ground terminal. An output terminal is electrically coupled to a drain of the at least one CMOS transistor. The MTJ operates in an antiparallel state and the output terminal provides a voltage indicative of a temperature of the MTJ device based on an MTJ antiparallel resistance. A distributed sensor network for real-time thermal mapping of an integrated circuit (IC) is also described.

10 Claims, 16 Drawing Sheets

MTJ, interconnect, and device layers

(56) References Cited

OTHER PUBLICATIONS

Brinkman, W., et al., "Tunneling Conductance of Asymmetrical Barriers," Journal of Applied Physics, vol. 41, No. 5, pp. 1915-1921, Apr. 1970.
Brokaw, A., "A Temperature Sensor with Single Resistor Set-point Programming," Proceedings of the IEEE International Solid-State Circuits Conference, pp. 334-335, Feb. 1996.
Chen, K., et al., "Thermal Sensor Allocation and Full-System Temperature Characterization for Thermal-Aware Mesh-based NoC System by using Compressive Sensing Technique," Proceedings of the IEEE International Symposium on VLSI Design, Automation and Test, pp. 1-4, Apr. 2017.
Chung, Y., et al., "Magnetic Tunnel Junction Temperature Sensors and Methods," U.S. Pat. No. 7,510,883. Jun. 2009.
Cui, J., et al., "A Fast High-Level Event-Driven Thermal Estimator for Dynamic Thermal Aware Scheduling," IEEE Transactions on Computer-Aided Design of Integrated Circuits and Systems, vol. 31, No. 6, pp. 904-917, Jun. 2012.
Das, A., et al., "Workload Change Point Detection for Runtime Thermal Management of Embedded Systems," IEEE Transactions on Computer-Aided Design of Integrated Circuits and Systems, vol. 35, No. 8, pp. 1358-1371, Aug. 2016.
Floyd, M., et al., "System Power Management Support in the IBM POWER6 Microprocessor," IBM Journal of Research and Development, vol. 51, No. 6, pp. 733-746, Nov. 2007.
Fu, Y. et al., "Thermal Sensor Placement and Thermal Reconstruction under Gaussian and Non-Gaussian Sensor Noises for 3D NoC," IEEE Transactions on Computer-Aided Design of Integrated Circuits and Systems, pp. 1-14, Oct. 2018.
Gilbertand, T., et al., The Bulletin of the American Physical Society, vol. 1, p. 25, 1956.
Heidecker, J., "MRAM Technology Status: NASA Electronic Parts and Packaging (NEPP) Program Office of Safety and Mission Assurance," Jet Propulsion Laboratory, NASA, Pasadena, California, Technical Report, Feb. 2013.
Julliere, M., "Tunneling between Ferromagnetic Films," Physics Letters A, vol. 54, No. 3, pp. 225-226, Sep. 1975.
Khan, A., et al., "Elastic and Inelastic Conductance in Co—Fe—B/MgO/Co—Fe—B Magnetic Tunnel Junctions," Physical Review B, vol. 82, No. 6, p. 064416, Aug. 2010.
Lee, H., et al., "Intel 22nm FinFET (22FFL) Process Technology for RF and mm Wave Applications and Circuit Design Optimization for FinFET Technology," Proceedings of the IEEE International Electron Devices Meeting, pp. 14.1.1-14.1.4, Dec. 2018.
Lee, Y., et al., "Embedded STT-MRAM in 28-nm FDSOI Logic Process for Industrial MCU/IoT Application," Proceedings of the IEEE Symposium on VLSI Technology, pp. 181-182, Jun. 2018.
Lim, J., et al., "Investigating the Statistical-Physical Nature of MgO Dielectric Breakdown in STT-MRAM at Different Operating Conditions," Proceedings of the IEEE International Electron Devices Meeting, pp. 25.3.1-25.3.4, Dec. 2018.
Ma, Q., et al., "Temperature Dependence of Resistance in Epitaxial Fe/MgO/Fe Magnetic Tunnel Junctions," Applied Physics Letters, vol. 95, No. 5, pp. 4-6, Jul. 2009.
Makinwa, A., "Smart Temperature Sensor Survey." [Online]. Available: http://ei.ewi.tudelft.nl/docs/TSensor survey.xls.
Malits, M., et al., "Nanometric Integrated Temperature and Thermal Sensors in CMOS-SOI Technology," Sensors, vol. 17, No. 8, p. 1739, Jul. 2017.
Malits, M., et al., "Study of CMOS-SOI Integrated Temperature Sensing Circuits for On-Chip Temperature Monitoring," Sensors, vol. 18, No. 5, p. 1629, May 2018.
Mansoor, M., et al., "Silicon Diode Temperature Sensors—A Review of Applications," Sensors and Actuators, A: Physical, vol. 232, pp. 63-74, Aug. 2015.
Monga, U., et al., "Impact of Self-Heating in SOI FinFETs on Analog Circuits and Interdie Variability," IEEE Electron Device Letters, vol. 32, No. 3, pp. 249-251, Mar. 2011.
Qoutb, A., et al., "PMTJ Temperature Sensor Utilizing VCMA," Proceedings of the IEEE International Symposium on Circuits and Systems, pp. 1-5, May 2019.
Qoutb, A., et al., "Spintronic/CMOS-Based Thermal Sensors," Proceedings of the IEEE International Symposium on Circuits and Systems, May 2020 (in press).
Sengupta, A., et al., "Magnetic Tunnel Junction as an On-Chip Temperature Sensor," Scientific Reports, vol. 7, No. 1, p. 11764, Dec. 2017.
Shang, C., et al., "Temperature Dependence of Magnetoresistance and Surface Magnetization in Ferromagnetic Tunnel Junctions," Physical Review B—Condensed Matter and Materials Physics, vol. 58, No. 6, pp. R2917-R2920, Aug. 1998.
Sheikh, F., et al., "An Overview and Classification of Thermal-Aware Scheduling Techniques for Multi-Core Processing Systems," Sustainable Computing: Informatics and Systems, vol. 2, No. 3, pp. 151-169, Sep. 2012.
Slonczewski, J., "Current-Driven Excitation of Magnetic Multilayers," Journal of Magnetism and Magnetic Materials, vol. 159, No. 1-2, pp. L1-L7, Jun. 1996.
Song, Y., et al., "Demonstration of Highly Manufacturable STT-MRAM Embedded in 28nm Logic," Proceedings of the IEEE International Electron Devices Meeting, pp. 18.2.1-18.2.4, Dec. 2018.
Vaisband, B., et al., "Thermal Conduction Path Analysis in 3-D ICs," Proceedings of the IEEE International Symposium on Circuits and Systems, pp. 594-597, Jun. 2014.
Yao, C., et al., "Calibrating On-Chip Thermal Sensors in Integrated Circuits: A Design-for-Calibration Approach," Journal of Electronic Testing: Theory and Applications, vol. 27, No. 6, pp. 711-721, Jun. 2011.
Yuan, L., et al., "Temperature Dependence of Magnetoresistance in Magnetic Tunnel Junctions with Different Free Layer Structures," Physical Review B, vol. 73, No. 13, p. 134403, Apr. 2006.
Zeng, Z., et al., "Bias Volt-age and Temperature Dependence of Magneto-Electric Properties in Double-Barrier Magnetic Tunnel Junction with Amorphous Co—Fe—B Electrodes," The European Physical Journal B-Condensed Matter and Complex Systems, vol. 52, No. 2, pp. 205-208, Jul. 2006.
Zhang, L., et al., "Addressing the Thermal Issues of STT-MRAM from Compact Modeling to Design Techniques," IEEE Transactions on Nanotechnology, vol. 17, No. 2, pp. 345-352, Mar. 2018.
Unknown, "Predictive Technology Model (PTM)." [Online]. Available: http://ptm.asu.edu/.

\* cited by examiner

|  |  | Circuit (a) | Circuit (b) | Circuit (c) | Circuit (d) |
|---|---|---|---|---|---|
| Sensitivity (mV/K) | Commercial (0: 85) | 0.51 | 0.51 | 0.4 | 1.91 |
|  | Industrial (-40:100) | 1.03 | 1.03 | 0.64 | 3.78 |
|  | Automotive (-40:125) | 1.08 | 1.08 | 0.77 | 3.97 |
|  | Military (-55:125) | 1.35 | 1.35 | 0.81 | 4.8 |
| Linearity | Commercial (0: 85) | 0.985 | 0.985 | 1 | 0.983 |
|  | Industrial (-40:100) | 0.953 | 0.953 | 0.999 | 0.96 |
|  | Automotive (-40:125) | 0.941 | 0.941 | 0.999 | 0.947 |
|  | Military (-55:125) | 0.919 | 0.919 | 0.996 | 0.936 |
| Power Consumption@RT 27°C ($\mu W$) | | 40 | 80 | 18 | 11.9 |
| Area ($\mu m^2$) | | 4X | 8X | 1X | 2X |

FIG. 10

Table II: Characteristics of the proposed distributed thermal network for different grid sizes

| System size | Energy consumption (pJ) | Path delay to read the grid | System size # | |
|---|---|---|---|---|
| | | | Transistors | MTJs |
| 4 × 4 | 1.32 | 4x | 90 | 16 |
| 8 × 8 | 8.96 | 8x | 304 | 64 |
| 16 × 16 | 65.50 | 16x | 1,120 | 256 |
| 32 × 32 | 499 | 32x | 4,980 | 1024 |

FIG. 12

Table III: Comparison between the proposed CMOS/MTJ thermal sensor and [12]

| | Proposed thermal aware system | [12] |
|---|---|---|
| Sensing Scheme | Change in AP resistance to temperature | Change in probability of switching |
| Sensor node | One MTJ, two transistors, $V_{dd}$ | Two MTJs, two transistors, $V_{dd}$, $I_{bias}$ |
| System Requirement | Latch-based amplifier | Circuit to map probability of switching an MTJ to temperature |
| Energy | 0.5 nJ (To read network of 32 × 32 cells) | 8.5 nJ |
| Accuracy | 3 K | 1 K |
| Output | 1 or 0 indicating above or below threshold temperature | Local temperature |

FIG. 14

Table IV: MTJ physical parameters

| Parameters | Description | Value |
|---|---|---|
| $w_{FL}$ | FM width = radius | 20 nm |
| $t_{FL}$ | FM thickness | 1.5 nm |
| $t_{ox}$ | Barrier thickness | 1.1 nm |
| $\Phi_{BL}$ | Barrier height | 0.39 eV |
| $V_h$ | Voltage @ half $TMR$ | 0.5 V |
| $S$ | Spin independent conductance factor | $1.1 \times 10^{-12}$ |
| $\beta_P$ | Fitting parameter for $P$ | $2.07 \times 10^{-5}$ |
| $\alpha_P$ | Fitting parameter for $P$ | 2.3 |
| $\beta_M$ | Fitting parameter for $M_S$ | 1.5 |
| $T^*$ | Fitting parameter | 1120 K |
| $\beta_{Ki}$ | Fitting parameter | 2.3 |
| $\beta_{\zeta VCMA}$ | Fitting parameter | 2.83 |
| $N_z$ | Demagnetization tensor factor in Z | 0.9343 |
| $N_{xy}$ | Demagnetization tensor factor in XY | 0.015 |
| $K_{i0}$ | Interfacial MA at 0 K | $2.02 \times 10^{-3} J/m^2$ |
| $M_{S0}$ | Saturation magnetization at 0 K | $1457 \times 10^3 A/m$ |
| $TMR_0$ | $TMR$ at 0 K | 3 |
| $\xi_{VCMA0}$ | VCMA factor at 0 K | $48.9 \times 10^{-15}$ J/(V.m) |

FIG. 15

DISTRIBUTED SPINTRONIC/CMOS SENSOR
NETWORK FOR THERMAL AWARE
SYSTEMS

STATEMENT REGARDING FEDERALLY FUNDED RESEARCH OR DEVELOPMENT

This invention was made with government support under CCF-1716091 awarded by the National Science Foundation. The government has certain rights in the invention.

FIELD OF THE APPLICATION

The application relates to thermal measurements within an integrated circuit (IC), particularly to sensor network to generate a thermal map of an internal structure of an IC.

BACKGROUND

Recent developments in IC technology rely on device scaling and 3-D integration, resulting in billions of devices compacted into a small area. These techniques deteriorate the system lifetime and reliability due to an increase in system temperature due to high power densities.

SUMMARY

A hybrid integrated thermal sensor device includes a magnetic tunnel junction (MTJ) device electrically coupled in series with at least one CMOS transistor and disposed between a voltage rail terminal and a ground terminal. An output terminal is electrically coupled to a drain of the at least one CMOS transistor. The MTJ operates in an antiparallel state and the output terminal provides a voltage indicative of a temperature of the MTJ device based on an MTJ antiparallel resistance.

The MTJ can be disposed between a ground terminal and a source terminal of the at least one CMOS transistor, and a second CMOS transistor is disposed between a drain terminal of the at least one CMOS transistor and voltage rail.

The at least one CMOS transistor can be configured as a common source amplifier.

The second CMOS transistor can be configured as an active load.

The active load can include a PMOS based current source.

The hybrid integrated thermal sensor device can further include an enable terminal electrically coupled to a gate of at least one CMOS transistor.

The output terminal can be electrically coupled to a first input terminal of a comparator, and a second input of the comparator electrically coupled to a settable reference voltage.

The hybrid integrated thermal sensor device can operate as a one bit digital thermal sensor with a settable threshold temperature.

The comparator can further include a sensor amplifier enable (SAEN) terminal electrically coupled to the comparator.

A distributed sensor network for real-time thermal mapping of an integrated circuit (IC) includes a control unit disposed in the IC. A plurality of hybrid MTJ/CMOS integrated thermal sensor devices are electrically coupled to the control unit. The control unit reads of each the hybrid MTJ/CMOS integrated thermal sensor devices to generate substantially in real-time, a thermal map of the IC.

The plurality of hybrid MTJ/CMOS integrated thermal sensor devices can include more than about 100 devices.

The plurality of hybrid MTJ/CMOS integrated thermal sensor devices can include one bit digital thermal sensors with a plurality of same or different settable threshold temperatures.

The distributed sensor network can further include a multiplexer circuit to switch a reference between different voltages to vary the settable threshold temperature of the one bit digital thermal sensors.

The plurality of hybrid MTJ/CMOS integrated thermal sensor devices can be configured in a grid based topology of m×n sensor nodes of m columns and n row.

The thermal map can include nodes below or above a threshold setting of each of the hybrid MTJ/CMOS integrated thermal sensor devices.

Each of the plurality of hybrid MTJ/CMOS integrated thermal sensor devices can be sequentially enabled and read by the control unit.

The control unit or a different control unit of the IC can dynamically manage at least one system of the IC based on the thermal map to mitigate deterioration of a lifetime of the IC or a reliability of the IC.

The control unit, or a different control unit, dynamically can configure substantially in real-time at least one logic module or at least one memory module of the IC based on the thermal map of the IC.

Based on the thermal map, the control unit, or the different control unit dynamically can move execution of a logic or an execution of a memory function from one module to a different similar function module of the IC dynamically in time to balance a thermal load between modules or to prevent an overheating of a module.

Based on the thermal map, the control unit, or the different control unit, can dynamically reconfigures the IC to optimize a thermal condition of the IC.

The foregoing and other aspects, features, and advantages of the application will become more apparent from the following description and from the claims.

BRIEF DESCRIPTION OF THE DRAWINGS

The features of the application can be better understood with reference to the drawings described below, and the claims. The drawings are not necessarily to scale, emphasis instead generally being placed upon illustrating the principles described herein. In the drawings, like numerals are used to indicate like parts throughout the various views.

FIG. 10 is a table (Table I) showing a comparison of the new temperature sensor devices of the Application (FIG. 9C and FIG. 9D), and conventional CMOS sensors (FIG. 9A and FIG. 9B in terms of sensitivity, linearity, power consumption, and area;

FIG. 12 is a table (Table II) showing characteristics of exemplary distributed thermal networks of different grid sizes;

FIG. 14 is a table (Table III) showing a comparison between the CMOS/MTJ thermal sensor of the Application and that of reference [12];

FIG. 15 is a table (Table IV) showing MTJ physical parameters; and

DETAILED DESCRIPTION

Figure 1:
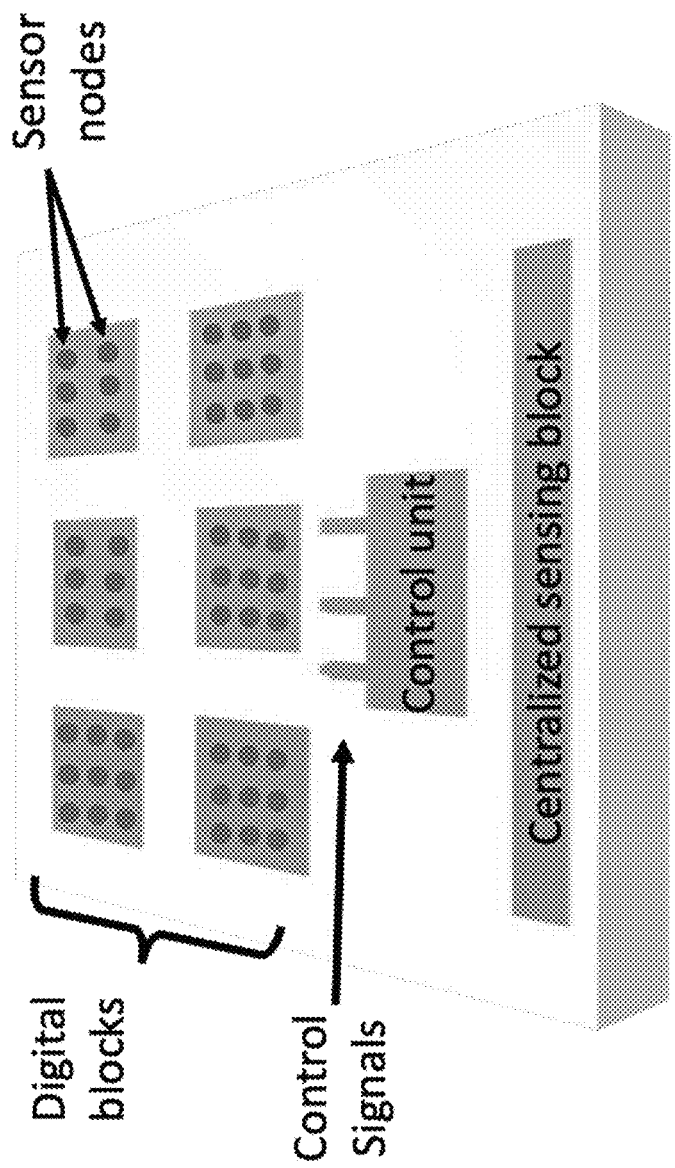
FIG. 1 is a drawing showing an exemplary distributed thermal network system according to the Application.

In the description, other than the bolded paragraph numbers, non-bolded square brackets ("[ ]") refer to the citations listed hereinbelow.

As described hereinabove, Recent developments in IC technology rely on device scaling and 3-D integration, resulting in billions of devices compacted into a small area. These techniques deteriorate the system lifetime and reliability due to an increase in system temperature due to high power densities.

Dynamically managing a system based on the thermal characteristics is important to mitigate these issues of deterioration of system lifetime and reliability. An on-chip thermal aware system which can include hundreds of distributed thermal sensors is described hereinbelow in this Application.

A new hybrid spintronic/CMOS based thermal sensor is also described that exploits the thermal response and small area of an antiparallel magnetic tunnel junction. The sensor cell can consume as little as 500 pJ to read 1,024 thermal sensor nodes and can, for example, generate a thermal map of a system composed of 32×32 thermal sensors. A sensor cell according to the Application, can exhibit a thermal linearity ($R^2$) up to 0.983 and a thermal sensitivity of 1.91 mV/K over the commercial temperature range of 0° C. to 85° C. while consuming 32 µW.

The description which follows is in 7 Parts. The new thermal aware system is described in Part 2, where the system architecture and circuit requirements are discussed. The new MTJ as a thermal sensor device is discussed in Part 3. A comparison between a CMOS diode and transistor based thermal sensor with an MTJ/transistor temperature sensor is provided in Part 3. Simulation results are presented in Part 4. Part 5 briefly describes suitable MTJ elements. Part 6 is a summary, and Appendix I, MTJ macrospin model follows the summary.

Part 1 Introduction

Two primary methods are used to achieve next generation integrated systems, a large number of deeply scaled devices and die stacking. High power densities and thermal issues such as long heat conduction paths are produced, which, in turn, can dramatically degrade performance, reliability, leakage current, and system robustness [1, 2]. To manage the system workload and protect the system from overheating, methods such as allocating heat conduction paths and specialized cooling systems are used [3, 4]. These systems should be supported with a temperature aware capability to allocate and properly respond to critical hot spots.

A thermal aware system can be achieved by distributing a large number of on-chip thermal sensors. These on-chip thermal sensors should be small in size, low power, high speed, sensitive, and accurate over a wide temperature range. The on-chip thermal sensors should be appropriately placed to accurately capture local hot spots. The location of the thermal sensors depends upon the sensor characteristics, system requirements, integrated circuit (IC) package, and cooling techniques [5].

A small number of thermal sensor nodes have typically been located around an IC, particularly near potential hot spots to support a thermal aware system. For instance, Intel utilizes one thermal sensor per core in the Xeon 5400 series [6], while 25 thermal sensors are embedded within the IBM POWER6 processor [7]. The use of a few thermal sensors, however, limits the ability to fully monitor the significant spatial and dynamic temperature variations across an integrated system [8].

Thermal aware systems manage the located distributed thermal sensor nodes around an IC, dynamically controlling the system workload [8, 9, 10]. These systems, however, utilize a software based management system which does not respond to individual thermal sensor nodes. In addition, the response time of these software solutions is long and consumes significant power; hence hardware solutions are desirable.

In this Application, an integrated system to support a thermal aware capability, shown in FIG. 1, is described, where multiple thermal sensor nodes are distributed across an IC.

Figure 3:
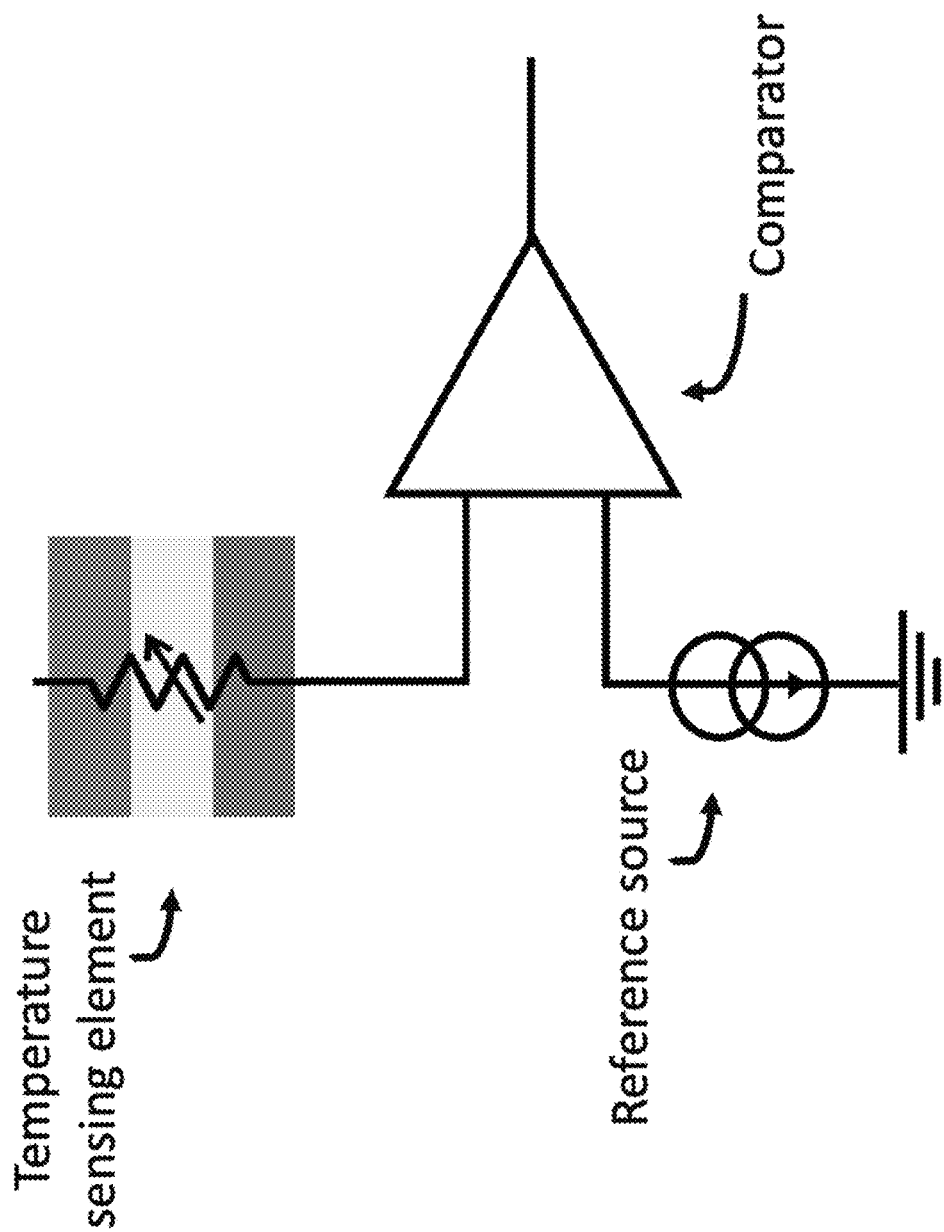
FIG. 3 is a schematic diagram showing an exemplary on-chip analog thermal sensor according to the Application.

The distributed thermal sensor nodes communicate with a centralized sensing unit which collects temperature information from the individual sensor nodes, producing a thermal map of the system. A new type of hybrid spintronic/CMOS based analog thermal sensor is also described hereinbelow, where the high temperature sensitivity of the magnetic tunnel junction (MTJ) antiparallel resistance is exploited. The sensor output is compared with a reference source, as shown in FIG. 3. The analog thermal sensor behaves as a threshold temperature-based sensor, triggering a signal if the temperature (or voltage) exceeds a certain reference temperature (or voltage).

Thermal sensors using spintronic technology have been previously described [11, 12]. For example, in [11], the influence of temperature on the probability of device switching is noted. Sensing a change in the switching probability requires additional circuitry.

However, as described by the Application in more detail hereinbelow, we realized that the temperature can be measured by a change in the antiparallel resistance.

The new system described by the Application includes a network of thermal sensor nodes distributed around an IC and additional circuitry, described in more detail in part 2, that manages and controls the sensor signals and hence the system performance, as schematically shown in FIG. 1.

Part 2 Distributed Thermal Network

The thermal aware system of the Application includes a network of thermal sensor nodes communicating with a control unit that collects temperature data and produces a thermal map. This thermal network provides the monitored system with dynamic real-time thermal information. The system architecture, read and data signaling, and related circuitry are discussed below. The system components are described in part 2A, the system signaling is illustrated in part 2B, and the ability to fabricate the system is described in part 2C.

Figure 2:
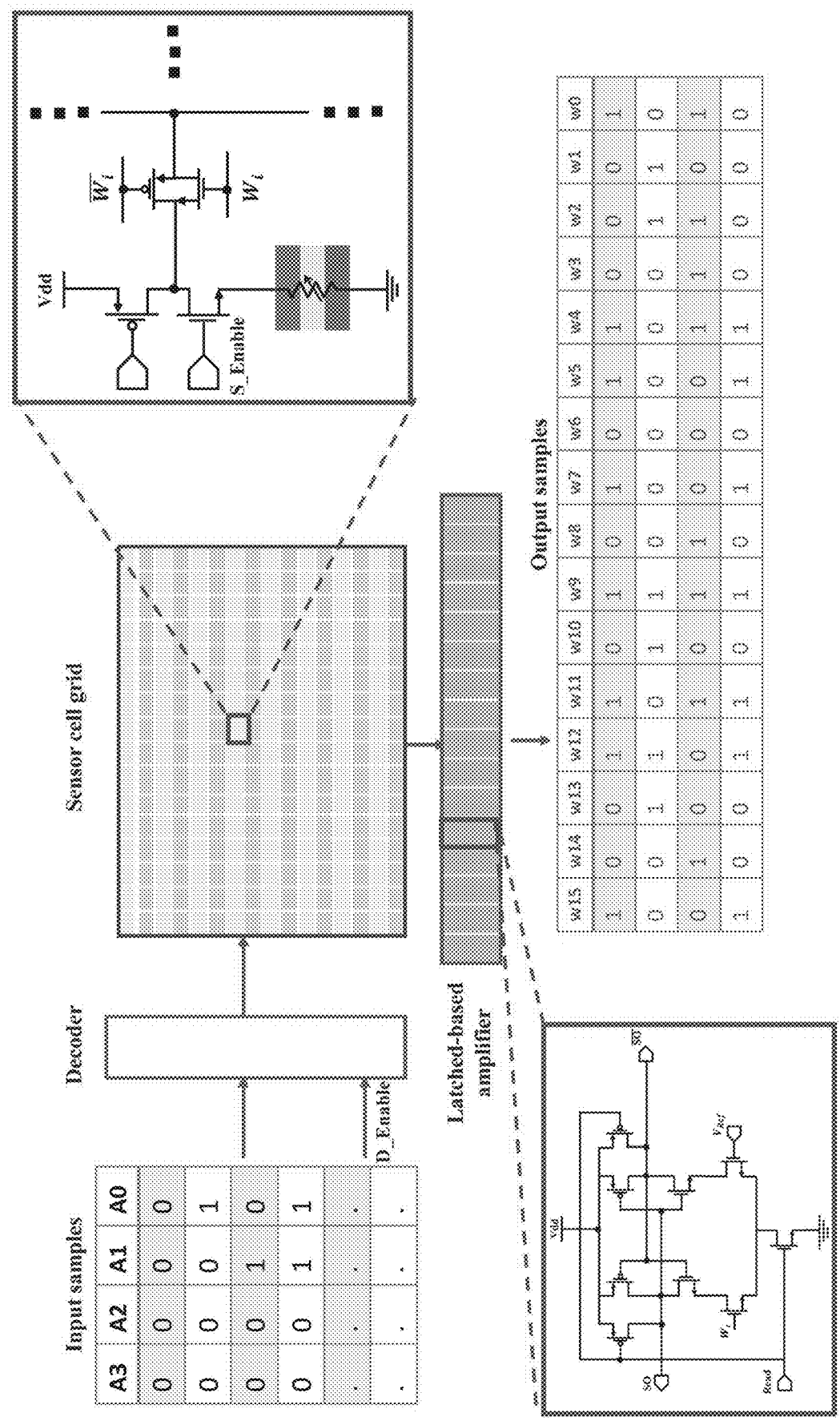
FIG. 2 is a drawing showing an exemplary distributed thermal network system according to the Application in more detail.

Part 2A, System architecture—The system architecture, shown in FIG. 2, is managed as a memory grid, where the sensor nodes are organized in a grid-based topology. To read a system of m×n sensor nodes with m columns and n rows, $\log_2$ n-to-n decoder and m amplifiers are required. The input to the system decoder identifies the row being read. Each row shares the same enable signal, while each column shares the same bit line. The enable signal, generated from a system decoder, writes the sensor node voltage to the bit line and is read through a sense amplifier. This exemplary sense amplifier is latch-based, composed of two inverters controlled by a Read signal. The sensor node voltage is compared with a reference voltage that sets a threshold temperature. The system output is in a binary format indicating whether the state of the sensor node is either below or above a threshold voltage.

Part 2B, System read and data signaling—The sequence of operations is as follows. During each read cycle, the enable signal controls the decoder to individually select one row. The output of each cycle is a vector of m sensor node reads. During each cycle, one row is read, and n cycles are required to read n rows. The system input is generated from a counter and the system output is stored within a memory.

Figure 4:
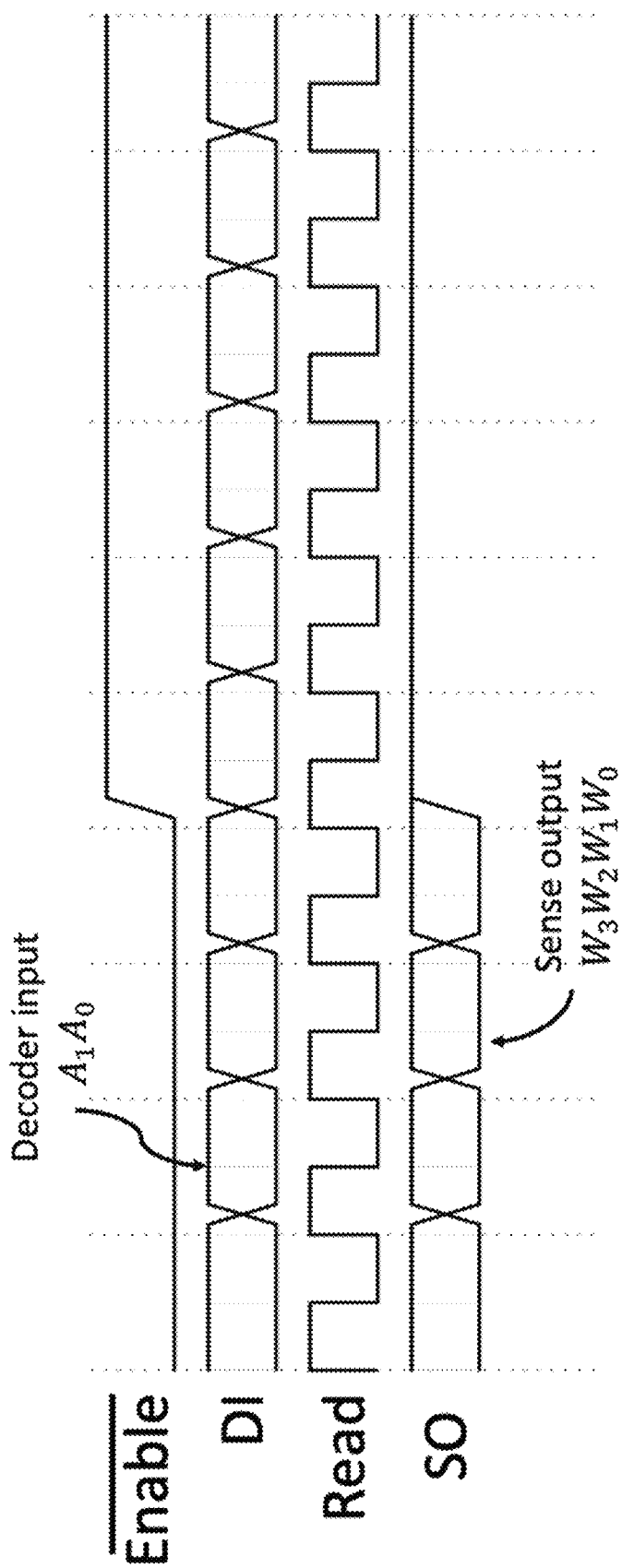
FIG. 4 is a waveform diagram showing an exemplary data signal waveform of a 4×4 data signal.

An example of the data signal waveform of a 4×4 data signal is shown in FIG. 4. The decoder and sensor nodes are enabled by the Enable signal, where the decoder input data are annotated as A0, A1. The output of the decoder enables the individual transmission gates. Each transmission gate connects the associated sensor node output to the bit line. The Read signal enables the sense amplifier to latch a bit line. In comparison with a reference voltage, the amplifier output is latched to either high or low. The output signals w0, w1, w2, and w3, indicate the temperature status. By turning the Enable signal off, the system saves energy by isolating the power from the sensor nodes and decoder.

Figure 5B:
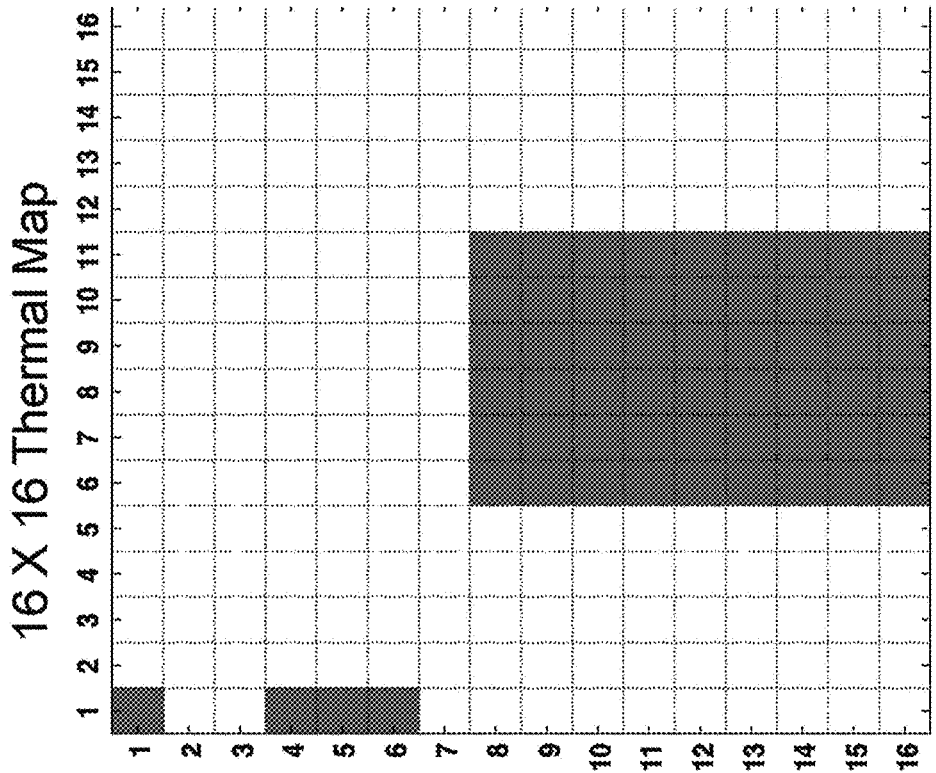
FIG. 5B is a grid showing a thermal map for the output sensor node readings of FIG. 5A.
Figure 5A:
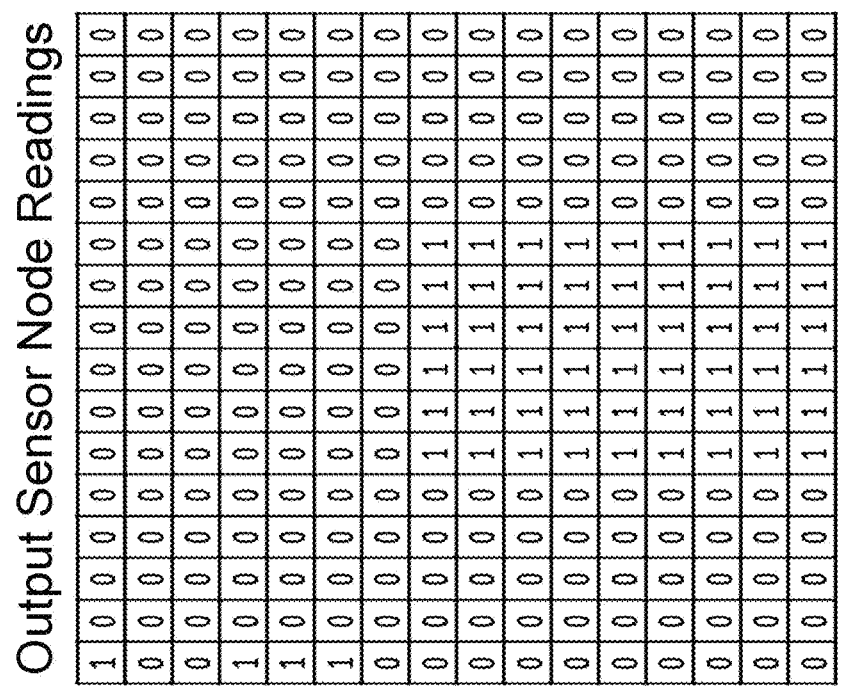
FIG. 5A is a grid showing exemplary output sensor node readings.

FIG. 5A and FIG. 5B show a 16 by 16 thermal map. FIG. 5A is a grid showing exemplary output sensor node readings. FIG. 5B is a grid showing a thermal map for the output sensor node readings of FIG. 5A. The dark areas represent nodes with a temperature above the temperature threshold. The output of the exemplary distributed thermal network is composed of 16×16 sensor nodes as illustrated in FIG. 5B. The binary thermal map, shown in FIG. 5A, reflects the location of the individual sensor nodes. The thermal map indicates if the temperature is above or below a predefined threshold temperature and hence determines in real-time the location of the critical hot spots.

Part 2C, System Implementation—The new system of the Application incorporates hybrid spintronic/CMOS devices. The spintronic circuit is based on a magnetic tunnel junction. An MTJ is a structure composed of two ferromagnetic layers separated by an insulator barrier [13]. The resistance of the device is controlled by the difference in the magnetization angle between the two layers. The device exhibits two stable states, a parallel (P) state (where the two layers are magnetized in the same direction) and an antiparallel (AP) state [14]. The MTJ is combined with CMOS to provide an efficient temperature sensing element. An MTJ/CMOS based thermal sensor exhibits small size, low power, high linearity, and high sensitivity [15]. These capabilities support use within a thermal aware system with hundreds of distributed thermal sensor nodes.

Figure 6:
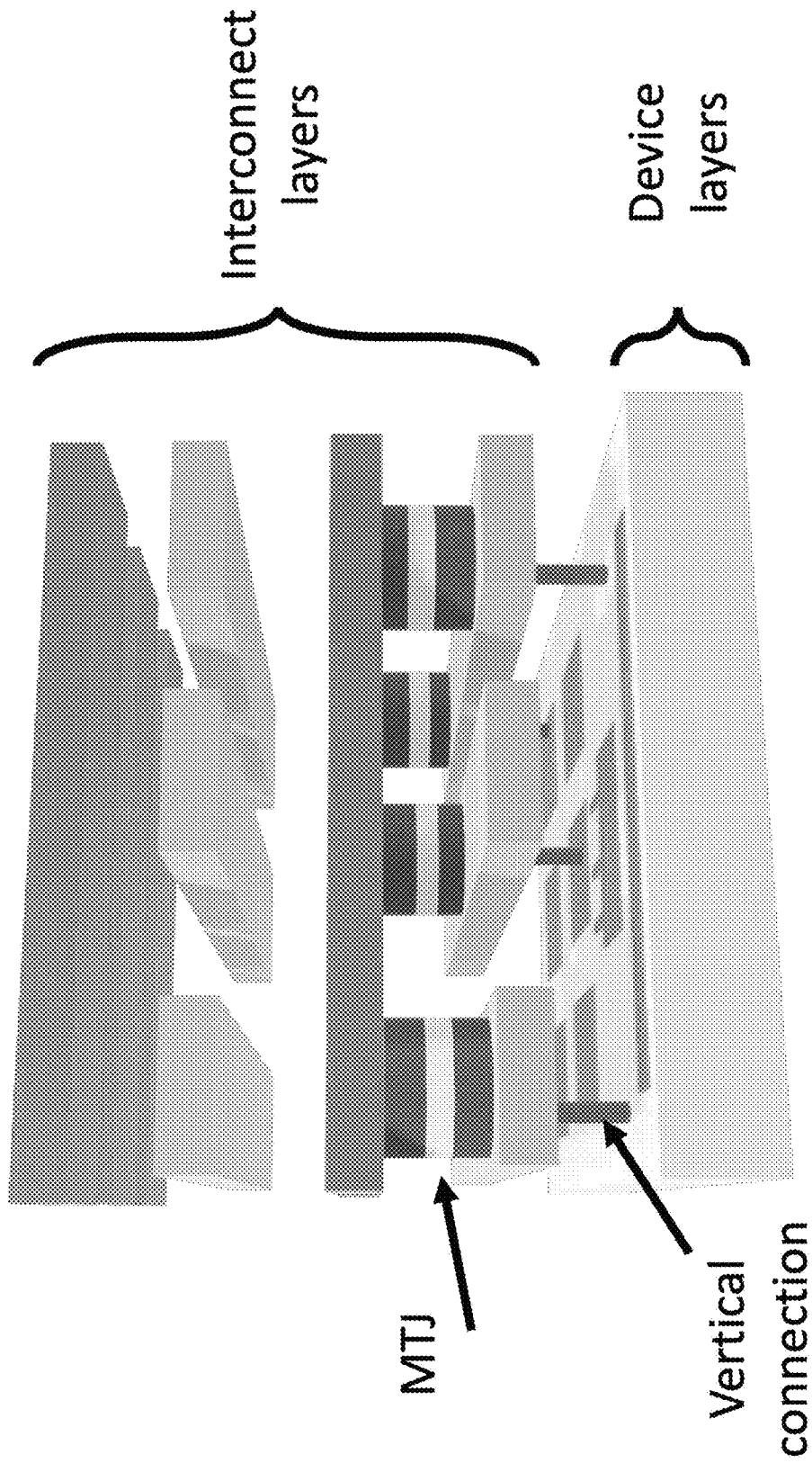
FIG. 6 is a drawing showing an exemplary MTJ, interconnects, and device layers structure.

The MTJ is integrated between the metallic layers above the CMOS device layers, as shown in FIG. 6, making this structure a good candidate for a local, distributed thermal sensor. MTJ fabrication is sufficiently mature for different technology platforms such as bulk-CMOS, FDSOI-CMOS, and FINFET CMOS [16]. Intel [17], GlobalFoundries [18], Samsung [19], and other large foundries are integrating MTJ technology with CMOS at different technology nodes. These advancements in fabrication can produce high quality MTJs for thermal sensing applications. In addition, MTJ memory can operate over a wide range of temperatures, −40° C. to 125° C., in a stable manner for commercial, automotive, and military applications [20]. The ability of MTJ technology to be integrated with CMOS, operate over a wide, stable temperature range, and exhibit almost zero leakage current in the off state, with higher temperature sensitivity than conventional CMOS devices suggests an MTJ/CMOS temperature sensor is an effective candidate for next generation thermal aware systems [15].

MTJ as a thermal sensor is supported by the high thermal sensitivity of the MTJ antiparallel resistance. The resistance of an MTJ changes almost linearly with high sensitivity with temperature in the antiparallel state (as compared to the parallel state) [21], [22], [23], [24]. The sensitivity of an MTJ to temperature has been described in multiple MTJ structures such as, CoFeB/Al-O/CoFeB [21], [22], Fe/MgO/Fe [23], and CoFeB/MgO/CoFeB [24]. The MTJ resistivity changes almost linearly with temperature in the antiparallel state (as compared to the parallel state) [19]. The thermal sensitivity of the MTJ antiparallel resistance depends upon the device material structure, dimensions, and applied sense voltage.

The temperature sensor cell is discussed in the following section. The physical, magnetic, and electrical behavior of an MTJ in addition to the described thermal sensor circuit are reviewed. A comparison between the new temperature sensors of the Application and conventional CMOS sensors in terms of sensitivity, linearity, power consumption, and area is also provided.

Part 3 Integrated Solutions for Thermal Monitoring

A variety of CMOS-based integrated electronic devices and circuits can produce a thermal response [25]. The most commonly used temperature sensor is the Brokaw bandgap circuit where a voltage or current produces a proportional-to-absolute temperature (PTAT) relationship [26, 27]. This circuit requires at least two large bipolar transistors to extract the PTAT signal. Other thermal sensors are based on a change in the threshold voltage of the diode or transistor with temperature [28]. This change in threshold voltage with temperature is exponential, requiring additional circuitry such as a threshold voltage extractor circuit [28] or look-up table [29] to accurately predict the temperature. Drawbacks of these technologies are high leakage current, large device capacitance (which influences the circuit response), poor stability, and low sensitivity over a wide temperature range with thermal cycling [4]. The need for calibration prior to use and low sensitivity with device scaling are also common issues [4].

This application describes a spintronic device, the MTJ, in a new use as a thermal sensing element for large scale distributed systems.

Temperature influences the MTJ device magnetic anisotropy, antiparallel resistance, charge magnetic polarization, and thermal induced magnetic field [30]. The influence of both the sense voltage and temperature on an MTJ is discussed in Part 3A. A comparison between four thermal sensors (a diode connected transistor, two paired transistors, a hybrid MTJ/transistor, and a hybrid MTJ/transistor with an active load) is described in Part 3B.

Part 3A, MTJ as an integrated thermal sensor—A macrospin model, described in the Appendix, is used here. The model includes the influence of the sense voltage and temperature on the device tunneling magnetoresistance TMR (T, V), layer spin polarization P(T), saturation magnetization $M_S$ (T), device magnetic anisotropy constant K(T), and voltage controlled magnetic ansitropy (VCMA) constant $\zeta_{VCMA}(T)$.

Figure 7:
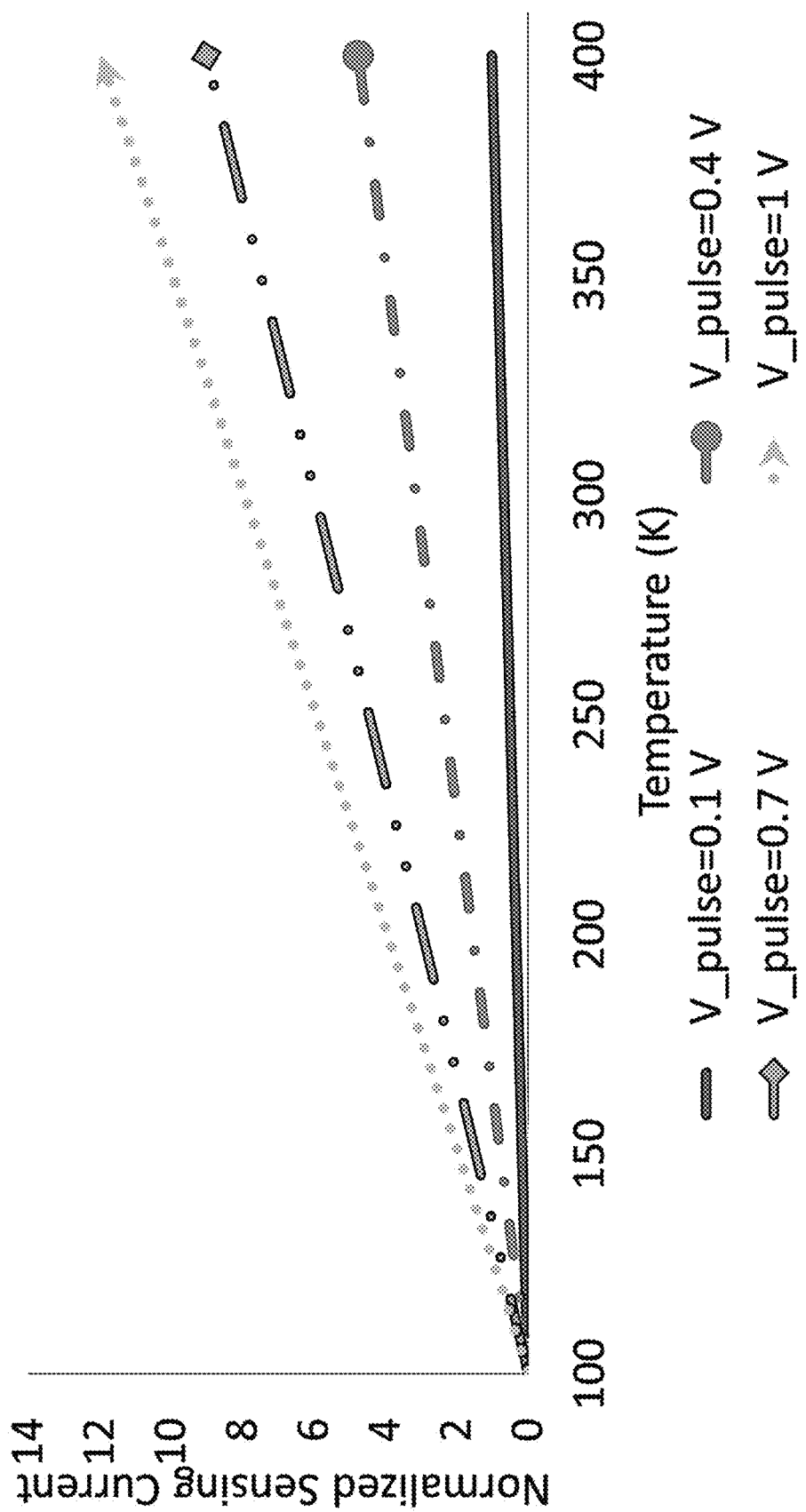
FIG. 7 is a graph showing a normalized sensing current of an exemplary AP MTJ at different sense voltages.

The influence of temperature on the conductance of an MTJ is the sum of two components, as described by (0); a spin dependent (elastic) term due to the thermal excitation of the spin polarized electrons, and a spin independent term (inelastic) due to scattering by defects/impurity states. The device antiparallel resistance decreases with an increase in temperature. Under different sense voltages, the device exhibits a different sensitivity rate, as shown in FIG. 7. FIG. 7 is a graph showing a normalized sensing current of an exemplary AP MTJ at different sense voltages [30].

The sensing technique considers the effects of temperature and sense voltage on the thermal stability and resistance of an MTJ. Hence, an MTJ operates in the stable AP state despite fluctuations in operating temperature and supply voltage. The thermal stability Δ of an MTJ determines the limits of the applied voltage and range of temperature over which the device can stably operate without switching [30]. Δ is the ratio of the magnetization energy of an MTJ and the thermal perturbation to the system, which is a function of temperature and applied voltage, $$\Delta(T, V) = \frac{\Delta E(T, V)|_{MTJ}}{K_B T} = \frac{K_{eff}(T, V) v_{FM}}{K_B T}, \quad (1)$$

where $K_B$ is the Boltzmann constant, $\Delta E$ (T, V)$|_{MTJ}$ is the system anisotropy energy of an MTJ, $K_{eff}$ is the effective anisotropy constant, and $v_{FM}$ is the volume of the FM layer.

Figure 8:
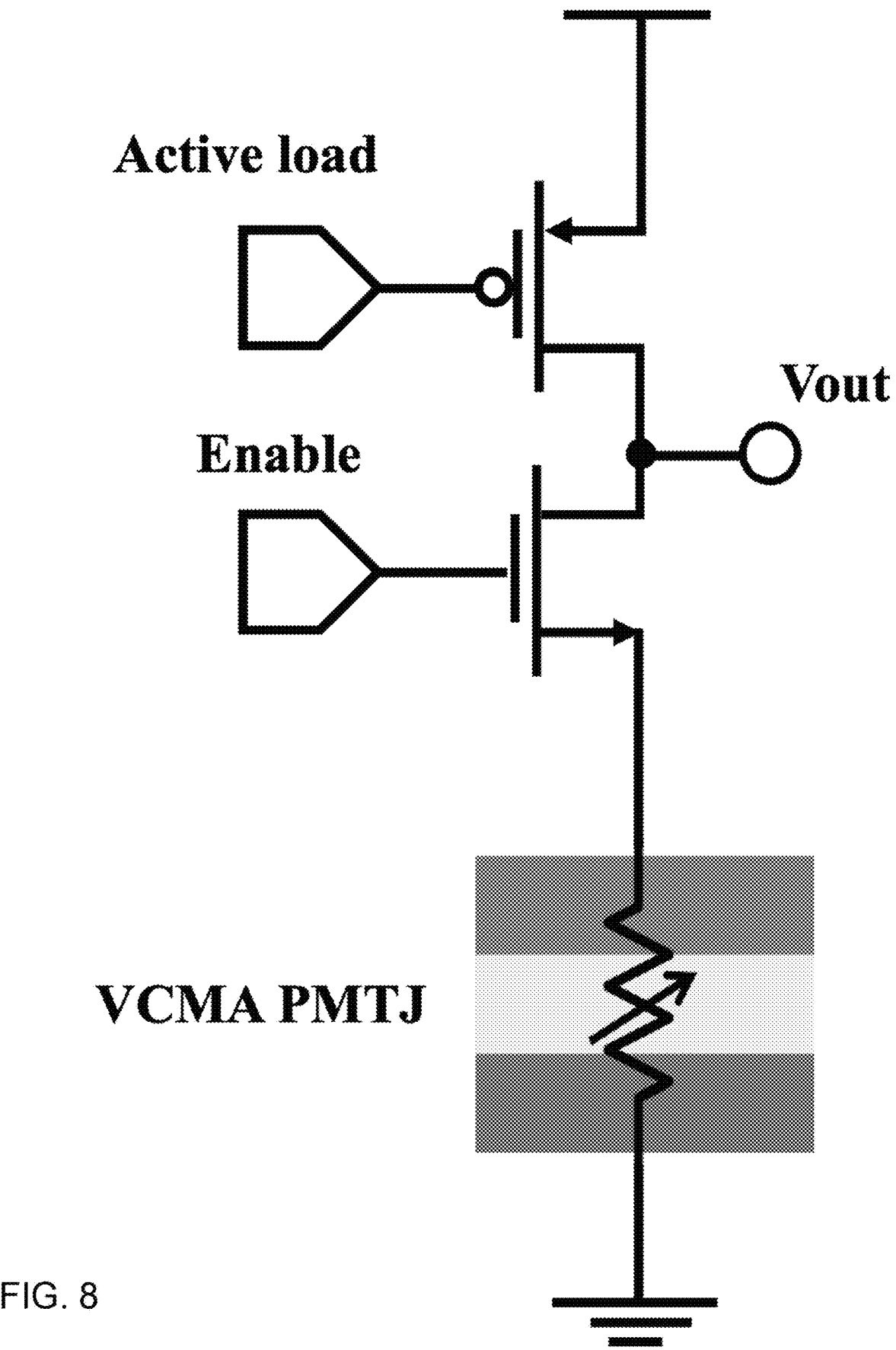
FIG. 8 is a schematic diagram showing an exemplary MTJ/CMOS-based thermal sensor according to the Application.

An exemplary MTJ-based thermal sensor according to the Application is illustrated in FIG. 8, where a common source amplifier with a PMOS based current source behaves as an active load. The active load bias and device size determines the circuit sensitivity. The increase in circuit sensitivity and linearity with temperature is compared in 3B with CMOS only based thermal sensors.

Part 3B, Comparison with conventional integrated solutions—A new hybrid MTJ/CMOS based thermal sensor is described in this Application. The circuit benefits from the influence of temperature on both the transistor threshold voltage and the MTJ antiparallel resistance. A comparison between four different circuits clarifies the advantages of an MTJ with CMOS as a thermal sensor. The four circuits are shown in FIG. 9A to FIG. 9D.

Figure 9A:
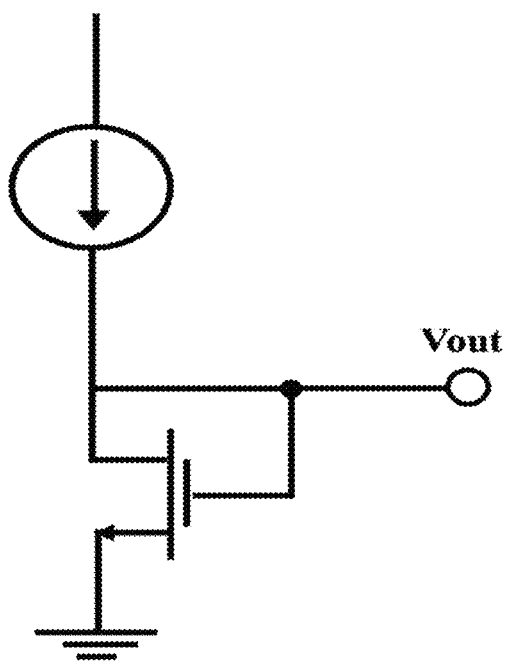
FIG. 9A is a schematic diagram showing a diode connected transistor temperature sensor.
Figure 9B:
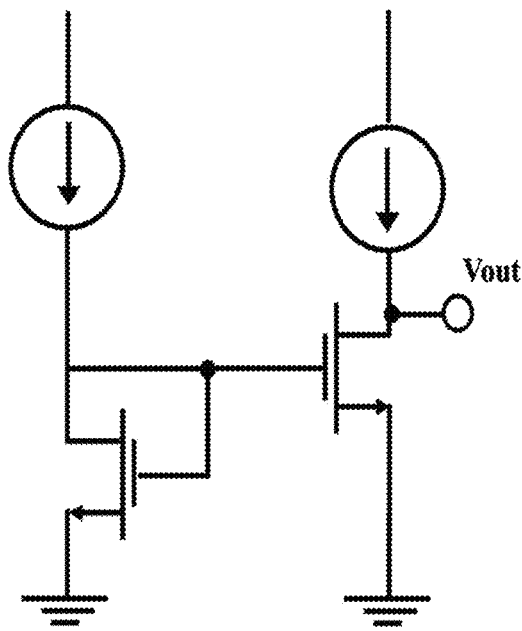
FIG. 9B is a schematic diagram showing a paired two transistor temperature sensor.

FIG. 9A and FIG. 9B show circuits which are CMOS only thermal sensors, where the circuit of FIG. 9A is a diode connected transistor based thermal sensor biased by a current source, and circuit of FIG. 9B is the same as circuit of FIG. 9A followed by a common source amplifier stage. In the circuit of FIG. 9B, the two transistors perform temperature sensing, which enhances the circuit stability and linearity with temperature.

Figure 9C:
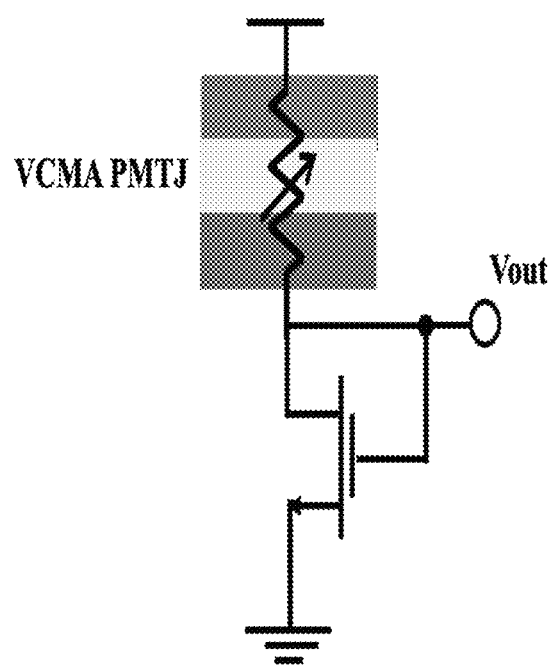
FIG. 9C is a schematic diagram showing an exemplary hybrid MTJ/transistor temperature sensor according to the Application.
Figure 9D:
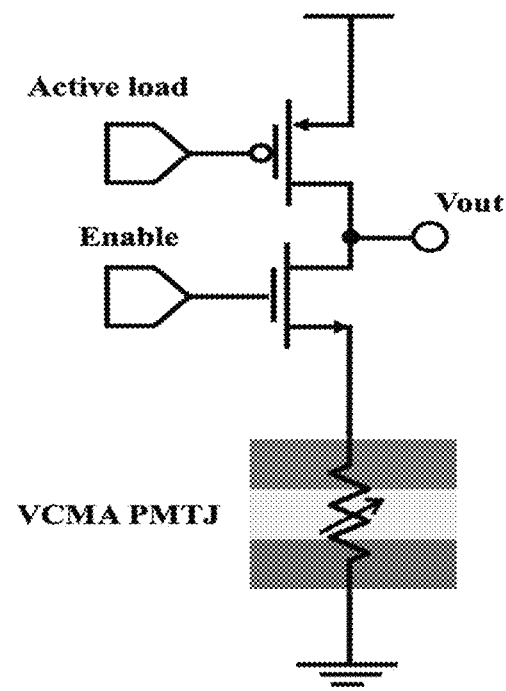
FIG. 9D is a schematic diagram showing an exemplary hybrid MTJ/transistor with an active load temperature sensor according to the Application.

The circuits FIG. 9C and FIG. 9D are MTJ/CMOS based thermal sensors according to the Application. A comparison of these sensor circuits is listed in Table I of FIG. 10. FIG. 10, Table I shows a comparison of the new temperature sensor devices of the Application (FIG. 9C and FIG. 9D), and conventional CMOS sensors (FIG. 9A and FIG. 9B in terms of sensitivity, linearity, power consumption, and area. The simulation results are based on the MTJ macrospin compact model [30] of a VCMA PMTJ and the predictive transistor model (16 nm PTM) for CMOS transistors [31]. The CMOS transistors are sized the same (32 nm×16 nm) and biased at the same current (31 nA) to establish a fair comparison.

For the two CMOS thermal sensors, the circuits exhibit good sensitivity with reasonable linearity. In the circuit of FIG. 9D, the two CMOS transistors and MTJ behave as temperature sensing elements. The circuit of FIG. 9D exhibits higher thermal sensitivity than of FIG. 9C. In terms of power consumption, the circuit of FIG. 9D exhibits the lowest power consumption. The MTJ/CMOS based thermal sensor requires less area because no current source is required. The circuit of FIG. 9B exhibits higher linearity than the circuit of FIG. 9A, however, the circuit of FIG. 9B requires larger transistors than the circuit of FIG. 9A.

Based on Comparison, the circuit of FIG. 9D is preferred (over the circuit of FIG. 9C) for use as the system-wide temperature sensor in the thermal aware system of the Application. In the following section, simulation results of the system of the Application incorporating the hybrid MTJ/transistor thermal sensor node are presented. A comparison between the thermal aware system of the Application in terms of energy consumption, delay, and system size is also described.

CMOS structures of the hybrid integrated thermal sensor device are typically fabricated on device layer (e.g. FIG. 6, device layer). Any suitable CMOS fabrication techniques and structures can be used, including, for example, bulk-CMOS, FDSOI-CMOS, and FINFET CMOS.

Part 4 Simulation Results

An exemplary system operation works as follows. The sense amplifier sets the sensor node voltage. Based on the grid size and number of nodes, preamplifier stages or buffers can be used to increase the current, enhance the sensitivity, and isolate the sensor node signal.

Figure 11:
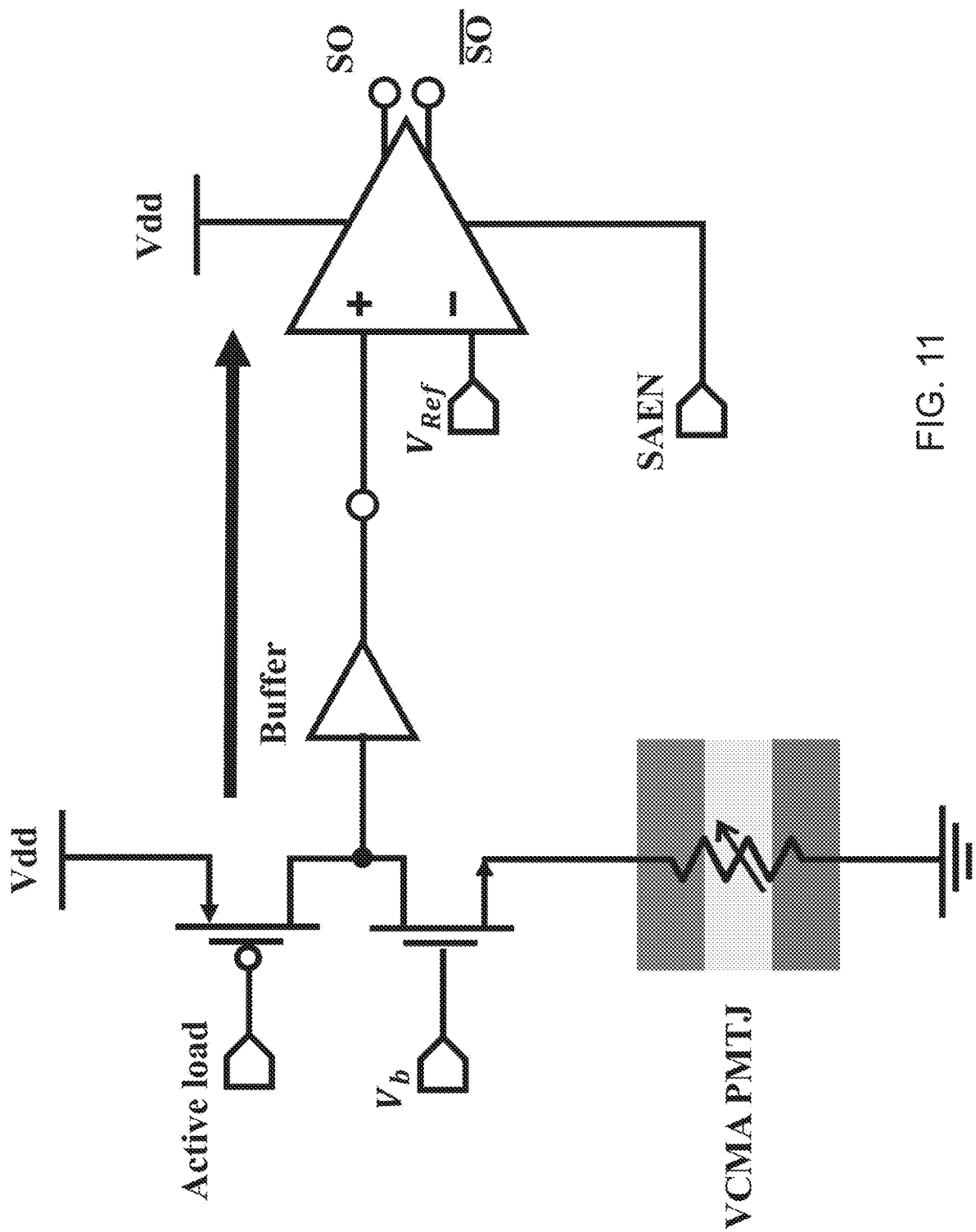
FIG. 11 is a schematic diagram showing a sensor signal path.

FIG. 11 is a schematic diagram showing a sensor signal path. The signal path of the sensor node to the output, shown in FIG. 11, is used to characterize system performance.

FIG. 12, Table II shows characteristics of exemplary distributed thermal networks of different grid sizes. The power consumption includes the energy consumed in the sensor nodes, buffers, inverters, amplifiers, and decoder. The delay of the read operation is the time required to read each of the rows.

A read pulse of 1 ns is used to produce an output decision of one sensor node. The comparator delay is 0.03 ns. The accuracy of the exemplary system temperature is ±3K for a reference voltage with an accuracy of ±1 mV. The area of each sensor node is 32 nm×64 nm where the MTJ layer is between the second and third interconnect layer, as shown in FIG. 6. Because of the influence of manufacturing process variations, the sensor nodes should be calibrated prior to use. Different calibration schemes of multiple on-chip thermal sensors have been proposed [4]. The design, management, and control of these thermal sensors are the foci of this paper.

Figure 13A:
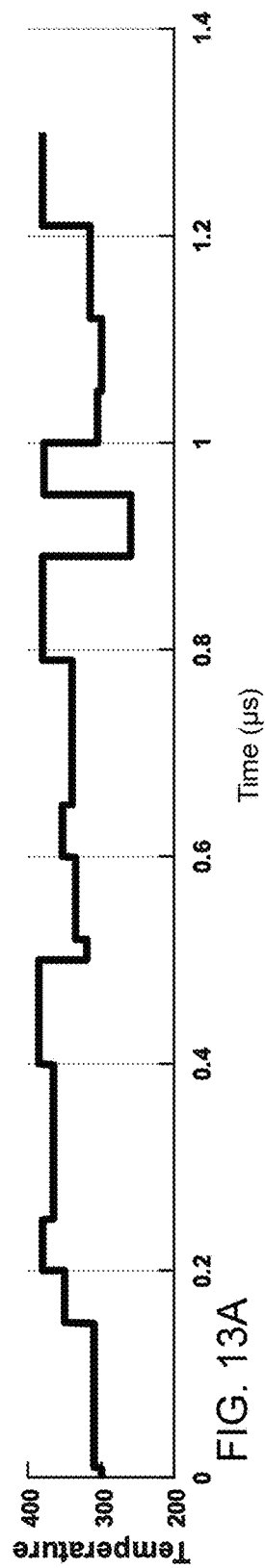
FIG. 13A is a graph showing the temperature at a system node versus time.
Figure 13B:
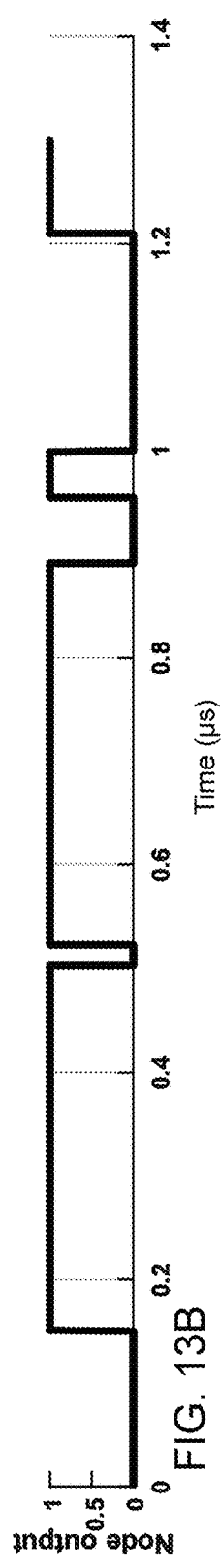
FIG. 13B is a graph showing the system node output for $V_{ref}=300$ mV which maps to a threshold temperature of T=332 K.
Figure 13C:
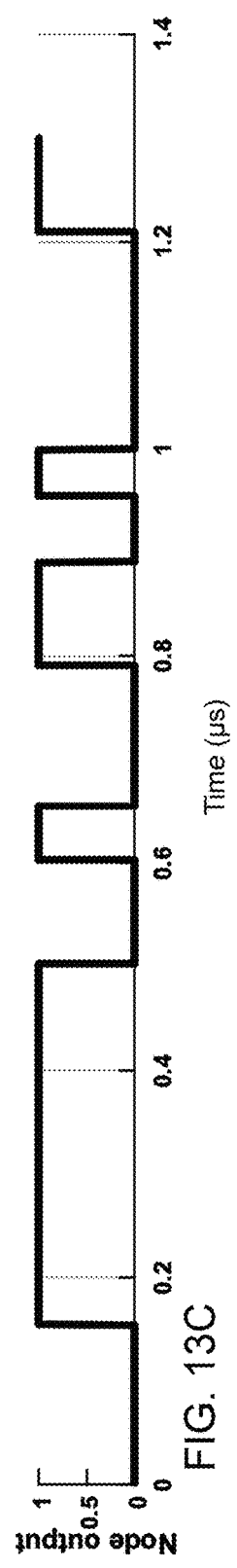
FIG. 13C is a graph showing the system node output for $V_{ref}=304$ mV and T=343 K.
Figure 13D:
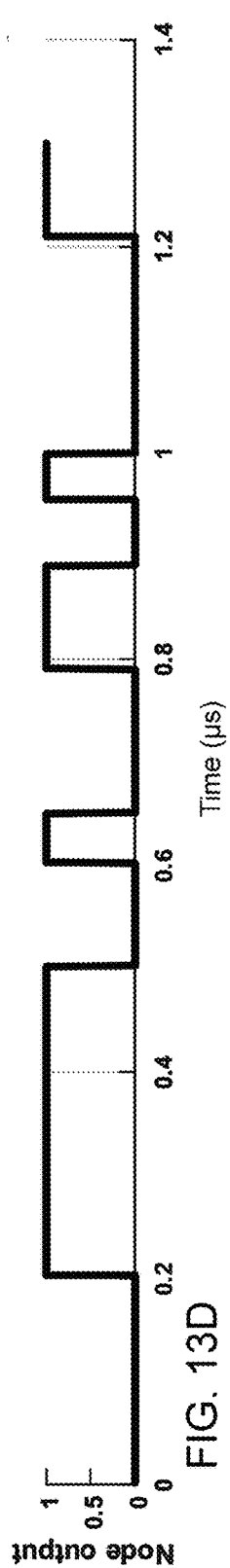
FIG. 13D is a graph showing the system node output for $V_{ref}=306$ mV and T=350 K.

FIG. 13A to FIG. 13D are graphs showing a system node output for different temperature threshold settings. FIG. 13A is a graph showing the temperature at a system node versus time. FIG. 13B is a graph showing the system node output for $V_{ref}$=300 mV which maps to a threshold temperature of T=332 K. FIG. 13C is a graph showing the system node output for $V_{ref}$=304 mV and T=343 K. FIG. 13D is a graph showing the system node output for $V_{ref}$=306 mV and T=350 K. An example of the system node output at three different reference voltages, 300 mV, 304 mV, and 306 mV, mapped to, respectively, threshold temperatures of 332 K, 343 K, and 350 K is shown in FIG. 13A to FIG. 13D. A multiplexer circuit can be added to switch the reference signal between different voltages to vary the threshold temperature of the sensor nodes.

A comparison between the proposed hybrid CMOS/MTJ thermal sensor and [12] in terms of system requirements, sensing scheme, energy, read accuracy, and temperature range is listed in FIG. 14, Table III. The Application describes a hybrid MTJ/CMOS-based thermal sensor and a related thermal aware system. The Application also describes a distributed thermal sensor network able to provide an updated spacial and temporal thermal map in real-time.

The system described by the Application provides flexibility in choosing a threshold temperature. The system can also support a multi-threshold sensing scheme. This capability can be achieved by multiplexing the reference voltage. At each reference voltage, the system identifies whether the temperature at a sensor node is above or below a certain threshold temperature. As an example, with two different reference voltages, the system could identify the temperature at a sensor node within three different temperature regions (below T1, between T1 and T2, or above T2).

With hundreds of on-chip thermal sensor nodes distributed across a system, the ability to monitor local heat (characterizing the generated heat and thermal paths) is achieved. This kind of real-time spacial and temporal sensing capability provides significant information characterizing the thermal behavior which can be used to mitigate heat generation and distribution issues.

Part 5 MTJ

Any suitable MTJ can be used where the MTJ can be operated as a temperature sensor, preferably in an anti-parallel state so that a temperature measurement over the operating temperature range of the MTJ device is based on an MTJ antiparallel resistance.

Figure 16:
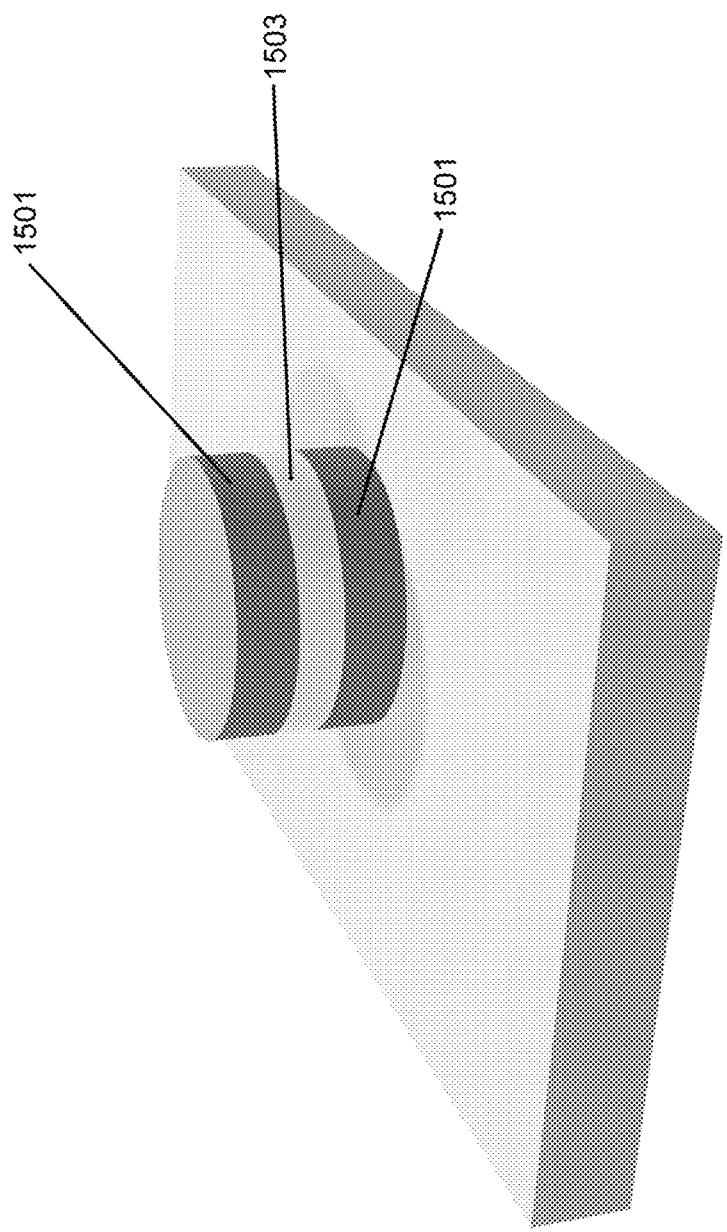
FIG. 16 is a drawing showing an exemplary MJT structure suitable for use in a hybrid integrated thermal sensor device.

FIG. 16 is a drawing showing one exemplary MJT structure which is suitable for use in a hybrid integrated thermal sensor device as described hereinabove (e.g. FIG. 8, FIG. 9c, and FIG. 9d). The MJT of FIG. 16 includes ferromagnetic layers 1501 separated by an insulation layer 1503. The MTJ structure of FIG. 16 can be built or fabricated above a heavy metal layer.

Other suitable MJTs include a heavy metal layer, such as, for example, the MJT base element described by U.S. Pat. No. 10,510,474 B2, SWITCHING OF PERPENDICULARLY MAGNETIZED NANOMAGNETS WITH SPIN-ORBIT TORQUES IN THE ABSENCE OF EXTERNAL MAGNETIC FIELDS, and co-pending CIP application U.S. patent application Ser. No. 16/850,173, SWITCHING OF PERPENDICULARLY MAGNETIZED NANOMAGNETS WITH SPIN-ORBIT TORQUES IN THE ABSENCE OF EXTERNAL MAGNETIC FIELDS, also assigned to the University of Rochester. Both of the '474 patent and '173 application describe exemplary suitable materials and fabrication techniques for MJTs. The '474 patent and '173 application are both incorporated herein by reference in their entirety for all purposes.

Generally, a magnetic tunnel junction includes at least two nanomagnets (magnetic free layers) separated by a tunnel barrier. Those skilled in the art of integrated MJT devices will understand that suitable MJTs for use in the new device, system, and methods according the Application, may include additional layers, such as, for example, non-magnetic layers, antiferromagnetic layers, electrode layer, etc., and combinations thereof. Any suitable MJT structure wherein the MJT operates in an anti-parallel state can be used.

Part 6 Summary

The need for a thermal aware system increases with device scaling and the size of the integrated system. A thermal aware system is described where a grid structure is composed of individual thermal sensor cells. The sensor nodes are based on hybrid spintronic/CMOS technology, where the antiparallel resistance of a magnetic tunnel junction exhibits a thermal linearity of 0.9 and thermal sensitivity of 4.8 mv/K over a temperature range of −55° C. to 125° C. An exemplary system of 1,045 thermal sensors distributed in a 32×32 grid structure consumes approximately 500 pJ. A thousand of thermal sensor nodes according to the Application can consume less than 1 nJ. Such low energy and high sensitivity sensor nodes are particularly appropriate for next generation thermal aware systems.

The plurality of hybrid MTJ/CMOS integrated thermal sensor devices can include one bit digital thermal sensors with a settable threshold temperature. The system can be updated to include multiple threshold temperatures. A multiplexer can be added so the user can define multiple threshold references which reflect multiple threshold temperatures.

A distributed sensor network as a thermal aware system as described hereinabove, can use a control unit, or another on-chip controller to dynamically configure at least one logic module or at least one memory module of an IC substantially in real-time based on said thermal map of the IC. The distributed sensor network can dynamically move execution of a logic or execution of a memory function from one module to a different similar function module of said IC dynamically in time to balance a thermal load between modules or to prevent an overheating of a module based on the thermal map. The control unit, or another on-chip controller can dynamically reconfigure the IC to optimize substantially in real-time a thermal condition of said IC based on the thermal map.

APPENDIX I—MTJ MACROSPIN MODEL

A macrospin compact model which characterizes a voltage controlled magnetic anisotropy (VCMA) MgO|CoFeB perpendicular MTJ is described here [30]. The model characterizes the dynamic response of the device magnetic and electrical performance. The magnetization dynamics of the device free ferromagnetic (FM) layer are described by the modified Landau-Lifshitz-Gilbert equation. The expression describes the dynamic magnetic behavior of the FM layer as $$\frac{\partial \vec{M}}{\partial t} = -\frac{\gamma \mu_o}{1+\alpha^2}\left[\vec{M} \times \vec{H}_{eff} + \alpha \vec{M} \times \frac{\partial \vec{M}}{\partial t}\right] + \gamma \sum \vec{\tau}_i, \quad (A.1)$$

where $\vec{M}$ is the normalized free layer magnetization, t is the time variable, $\vec{H}_{eff}$ is the effective magnetic field expressed in A/m, y is the electron gyromagnetic ratio, $y \approx -2\pi \times 27.99$ GHz/T, $\mu_o$ is the permeability of free space, a is the Gilbert damping factor, and $\vec{\tau}_i$ is the torque applied due to other perturbations such as current which exerts a spin transfer torque [27]. The macrospin model is developed in association with the static and dynamic micromagnetic analysis of the system energy. The effective magnetic field applied to the free layer $\vec{H}_{eff}$ is $$\vec{H}_{eff} = \vec{H}_{UA} - \vec{H}_{dem} + \vec{H}_c + \vec{H}_{ext} - \vec{H}_{VCMA} + \vec{H}_{th}, \quad (A-2)$$

where $\vec{H}_{UA}$ is the uniaxial anisotropy field sometimes defined as $\vec{H}_K$, $\vec{H}_{dem}$ is the demagnetization field, $\vec{H}_c$ is the coupling field due to the other FM layer, $\vec{H}_{ext}$ is the applied external magnetic field, $\vec{H}_{VCMA}$ is due to VCMA, and $\vec{H}_{th}$ is the stochastic magnetic field due to thermal variations.

The MTJ antiparallel conductance is modeled as [28]

$$G_{AP}(T) = G_T[1-P_1(T)P_2(T)] + G_{SI}, \quad (A.3)$$

where $G_T = G_0 (\sin(CT)/CT)$ is the thermal smearing factor, $G_0 = (3.16 \times 10^{10} \sqrt{\phi_B}/t_{ox})\exp(-1.025 \times \sqrt{\phi_B} \times t_{ox})$ is the parallel state conductance at zero voltage and zero temperature, T is the ambient temperature, $\phi_B$ is the average tunneling barrier height (in eV), $t_{ox}$ is the thickness of the insulator barrier layer, and $C = 1.387 \times 10^{-4} t_{ox}/\sqrt{\phi_B}$ is a material dependent parameter [28]. $G_{SI} = ST^{4/3}$ is the inelastic spin independent conductance, and S is a fitting parameter. The dependence of the spin polarization on temperature can be fitted as [29, 30]. $P_1$ and $P_2$ are the spin polarization percentage of the two FM layers. The dependence of the spin polarization on temperature can be fitted as [34, 21]

$$P(T) = P(0)[1-\beta_P T^{\alpha_P}], \quad (A.4)$$

where $\beta_P$ and $\alpha_P$ are fitting parameters related to the device dimensions and material properties.

The physical parameters are based on perpendicular magnetic anisotropy and VCMA MgO|CoFeB [25,31,32]. The experimentally extracted model parameters are listed in FIG. 15, Table IV, MTJ physical parameters.

Models, software, and firmware in support of a distributed spintronic/CMOS sensor network for thermal aware systems can be provided on a computer readable non-transitory storage medium. A computer readable non-transitory storage medium as non-transitory data storage includes any data stored on any suitable media in a non-fleeting manner Such data storage includes any suitable computer readable non-transitory storage medium, including, but not limited to hard drives, non-volatile RAM, SSD devices, CDs, DVDs, etc.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

REFERENCES

[1] U. Monga et al., "Impact of Self-Heating in SOI FinFETs on Analog Circuits and Interdie Variability," *IEEE Electron Device Letters*, vol. 32, no. 3, pp. 249-251, March 2011.

[2] Y. Fu et al., "Thermal Sensor Placement and Thermal Reconstruction under Gaussian and Non-Gaussian Sensor Noises for 3D NoC," *IEEE Transactions on Computer-Aided Design of Integrated Circuits and Systems*, pp. 1-14, October 2018.

[3] B. Vaisband, I. Savidis, and E. G. Friedman, "Thermal Conduction Path Analysis in 3-D ICs," *Proceedings of the IEEE International Symposium on Circuits and Systems*, pp. 594-597, June 2014.

[4] C. Yao, K. K. Saluja, and P. Ramanathan, "Calibrating On-Chip Thermal Sensors in Integrated Circuits: A Design-for-Calibration Approach," *Journal of Electronic Testing: Theory and Applications*, vol. 27, no. 6, pp. 711-721, June 2011.

[5] M. Malits and Y. Nemirovsky, "Nanometric Integrated Temperature and Thermal Sensors in CMOS-SOI Technology," *Sensors*, vol. 17, no. 8, p. 1739, July 2017.

[6] M. Mansoor, I. Haneef, S. Akhtar, A. De Luca, and F. Udrea, "Silicon Diode Temperature Sensors—A Review of Applications," *Sensors and Actuators, A: Physical*, vol. 232, pp. 63-74, August 2015.

[7] M. S. Floyd et al., "System Power Management Support in the IBM POWER6 Microprocessor," *IBM Journal of Research and Development*, vol. 51, no. 6, pp. 733-746, November 2007.

[8] H. F. Sheikh, I. Ahmad, Z. Wang, and S. Ranka, "An Overview and Classification of Thermal-Aware Scheduling Techniques for Multi-Core Processing Systems," *Sustainable Computing: Informatics and Systems*, vol. 2, no. 3, pp. 151-169, September 2012.

[9] A. Das, G. V. Merrett, M. Tribastone, and B. M. Al-Hashimi, "Workload Change Point Detection for Runtime Thermal Management of Embedded Systems," *IEEE Transactions on Computer-Aided Design of Integrated Circuits and Systems*, vol. 35, no. 8, pp. 1358-1371, August 2016.

[10] K.-C. Chen, Y.-H. Chen, and Y.-P. Lin, "Thermal Sensor Allocation and Full-System Temperature Characterization for Thermal-Aware Mesh-based NoC System by using Compressive Sensing Technique," *Proceed-ings of the IEEE International Symposium on VLSI Design, Automation and Test*, pp. 1-4, April 2017.

[11] Y. S. Chung, R. W. Baird, and M. A. Dulram, "Magnetic Tunnel Junction Temperature Sensors and Methods," U.S. Pat. No. 7,510,883. June 2009.

[12] A. Sengupta, C. M. Liyanagedera, B. Jung, and K. Roy, "Magnetic Tunnel Junction as an On-Chip Temperature Sensor," *Scientific Reports*, vol. 7, no. 1, p. 11764, December 2017.

[13] M. Julliere, "Tunneling between Ferromagnetic Films," *Physics Letters A*, vol. 54, no. 3, pp. 225-226, September 1975.

[14] J. C. Slonczewski, "Current-DrivenExcitationofMagneticMultilayers," *Journal of Magnetism and Magnetic Materials*, vol. 159, no. 1-2, pp. L1-L7, June 1996.

[15] A. G. Qoutb and E. G. Friedman, "Spintronic/CMOS-Based Thermal Sensors," *Proceedings of the IEEE International Symposium on Circuits and Systems*, May 2020 (in press).

[16] Y. K. Lee et al., "Embedded STT-MRAM in 28-nm FDSOI Logic Process for Industrial MCU/IoT Application," *Proceedings of the IEEE Symposium on VLSI Technology*, pp. 181-182, June 2018.

[17] H.-J. Lee et al., "Intel 22 nm FinFET (22FFL) Process Technology for RF and mm Wave Applications and Circuit Design Optimization for FinFET Technology," *Proceedings of the IEEE International Electron Devices Meeting*, pp. 14.1.1-14.1.4, December 2018.

[18] J. Lim et al., "Investigating the Statistical-Physical Nature of MgO Dielectric Breakdown in STT-MRAM at Different Operating Conditions," *Proceedings of the IEEE International Electron Devices Meeting*, pp. 25.3.1-25.3.4, December 2018.

[19] Y. J. Song et al., "Demonstration of Highly Manufacturable STT-MRAM Embedded in 28 nm Logic," *Proceedings of the IEEE International Electron Devices Meeting*, pp. 18.2.1-18.2.4, December 2018.

[20] J. Heidecker, "MRAM Technology Status: NASA Electronic Parts and Packaging (NEPP) Program Office of Safety and Mission Assurance," Jet Propulsion Laboratory, NASA, Pasadena, Calif., Technical Report, February 2013.

[21] L. Yuan, S. H. Liou, and D. Wang, "Temperature Dependence of Magnetoresistance in Magnetic Tunnel Junctions with Different Free Layer Structures," *Physical Review B*, vol. 73, no. 13, p. 134403, April 2006.

[22] Z. Zeng, Y. Wang, X. Han, W. Zhan, and Z. Zhang, "Bias Volt-age and Temperature Dependence of Magneto-Electric Properties in Double-Barrier Magnetic Tunnel Junction with Amorphous Co—Fe—B Electrodes," *The European Physical Journal B-Condensed Matter and Complex Systems*, vol. 52, no. 2, pp. 205-208, July 2006.

[23] Q. L. Ma et al., "Temperature Dependence of Resistance in Epitax-ial Fe/MgO/Fe Magnetic Tunnel Junctions," *Applied Physics Letters*, vol. 95, no. 5, pp. 4-6, July 2009.

[24] A. A. Khan et al., "Elastic and Inelastic Conductance in Co—Fe—B/MgO/Co—Fe—B Magnetic Tunnel Junctions," *Physical Review B*, vol. 82, no. 6, p. 064416, August 2010.

[25] K. Makinwa, "Smart Temperature Sensor Survey." [Online]. Available: http://ei.ewi.tudelft.nl/docs/TSensor survey.xls

[26] A. P. Brokaw, "A Temperature Sensor with Single Resistor Set-point Programming," *Proceedings of the IEEE International Solid-State Cir-cuits Conference*, pp. 334-335, February 1996.

[27] A. Bakker and J. Huijsing, "Micropower CMOS Temperature Sensor with Digital Output," *IEEE Journal of Solid-State Circuits*, vol. 31, no. 7, pp. 933-937, July 1996.

[28] M. Malits, I. Brouk, and Y. Nemirovsky, "Study of CMOS-SOI Integrated Temperature Sensing Circuits for On-Chip Temperature Monitor-ing," *Sensors*, vol. 18, no. 5, p. 1629, May 2018.

[29] J. Cui and D. L. Maskell, "A Fast High-Level Event-Driven Thermal Estimator for Dynamic Thermal Aware Scheduling," *IEEE Transactions on Computer-Aided Design of Integrated Circuits and Systems*, vol. 31, no. 6, pp. 904-917, June 2012.

[30] A. G. Qoutb and E. G. Friedman, "PMTJ Temperature Sensor Utilizing VCMA," *Proceedings of the IEEE International Symposium on Circuits and Systems*, pp. 1-5, May 2019.

[31] "Predictive Technology Model (PTM)." [Online]. Available: http://ptm.asu.edu/

[32] T. L. Gilbert and H. Ekstein, "BasisoftheDomainStructureVariational Principle," *The Bulletin of the American Physical Society*, vol. 1, p. 25, 1956.

[33] W. F. Brinkman, R. C. Dynes, and J. M. Rowell, "Tunneling Conductance of Asymmetrical Barriers," *Journal of Applied Physics*, vol. 41, no. 5, pp. 1915-1921, April 1970.

[34] C. H. Shang, J. Nowak, R. Jansen, and J. S. Moodera, "Temperature Dependence of Magnetoresistance and Surface Magnetization in Ferromagnetic Tunnel Junctions," *Physical Review B—Condensed Matter and Materials Physics*, vol. 58, no. 6, pp. R2917-R2920, August 1998.

[35] J. G. Alzate et al., "Temperature Dependence of the Voltage-Controlled Perpendicular Anisotropy in Nanoscale MgO—CoFeB—Ta Magnetic Tunnel Junctions," *Applied Physics Letters*, vol. 104, no. 11, p. 112410, March 2014.

[36] L. Zhang et al., "Addressing the Thermal Issues of STT-MRAM from Compact Modeling to Design Techniques," *IEEE Transactions on Nanotechnology*, vol. 17, no. 2, pp. 345-352, March 2018.

What is claimed is:

1. A distributed sensor network for real-time thermal mapping of an integrated circuit (IC) comprising:
 a control unit disposed in said IC; and
 a plurality of hybrid MTJ/CMOS integrated thermal sensor devices electrically coupled to said control unit;
 wherein said control unit reads each of said hybrid MTJ/CMOS integrated thermal sensor devices to generate substantially in real-time, a thermal map of said IC, and
 wherein said plurality of hybrid MTJ/CMOS integrated thermal sensor devices comprises one bit digital thermal sensors with a plurality of same or different settable threshold temperatures.

2. The distributed sensor network of claim 1, wherein said plurality of hybrid MTJ/CMOS integrated thermal sensor devices comprises more than about 100 devices.

3. The distributed sensor network of claim 1, further comprising a multiplexer circuit to switch a reference voltage between different voltages to vary said settable threshold temperature of said one bit digital thermal sensors.

4. The distributed sensor network of claim 1, wherein said plurality of hybrid MTJ/CMOS integrated thermal sensor devices are configured in a grid based topology of m×n sensor nodes of m columns and n rows.

5. The distributed sensor network of claim 1, wherein said thermal map comprises nodes below or above a threshold setting of each of said hybrid MTJ/CMOS integrated thermal sensor devices.

6. The distributed sensor network of claim 1, wherein each of said plurality of hybrid MTJ/CMOS integrated thermal sensor devices is sequentially enabled and read by said control unit.

7. The distributed sensor network of claim 1, wherein control unit or a different control unit of said IC dynamically manages at least one system of said IC based on said thermal map to mitigate deterioration of a lifetime of said IC or a reliability of said IC.

8. The distributed sensor network of claim 1, wherein said control unit, or a different control unit, dynamically configures substantially in real-time at least one logic module or at least one memory module of said IC based on said thermal map of said IC.

9. The distributed sensor network of claim 8, wherein based on said thermal map, said control unit or said different control unit dynamically moves execution of a logic or an execution of a memory function from at least one module to a different similar function module of said IC dynamically in time to balance a thermal load between modules or to prevent an overheating of a module.

10. The distributed sensor network of claim 8, wherein based on said thermal map, said control unit, or said different control unit, dynamically reconfigures said IC to optimize a thermal condition of said IC.

* * * * *